United States Patent
Dong et al.

(10) Patent No.: US 11,314,655 B2
(45) Date of Patent: Apr. 26, 2022

(54) STORAGE DEVICE CONFIGURABLE MAPPING GRANULARITY SYSTEM WHERE DATA IS WRITTEN WITHOUT PERFORMING READ-MODIFY-WRITE OPERATIONS

(71) Applicant: Dell Products L.P., Round Rock, TX (US)

(72) Inventors: Wei Dong, Shanghai (CN); Weilin Liu, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 30 days.

(21) Appl. No.: 16/750,594

(22) Filed: Jan. 23, 2020

(65) Prior Publication Data

US 2021/0026781 A1 Jan. 28, 2021

(30) Foreign Application Priority Data

Jul. 25, 2019 (CN) .......................... 201910675677.8

(51) Int. Cl.
*G06F 12/1009* (2016.01)

(52) U.S. Cl.
CPC .... *G06F 12/1009* (2013.01); *G06F 2212/657* (2013.01); *G06F 2212/7201* (2013.01)

(58) Field of Classification Search
CPC ....... G06F 2212/651; G06F 2212/7201; G06F 12/0866; G06F 2212/1021; G06F 2212/50; G06F 12/1009; G06F 2212/657
See application file for complete search history.

(56) References Cited

U.S. PATENT DOCUMENTS

| | | | | |
|---|---|---|---|---|
| 2014/0129760 | A1* | 5/2014 | Lee | G06F 12/0246 711/103 |
| 2016/0117115 | A1* | 4/2016 | Mehra | G06F 3/0631 711/112 |
| 2016/0342463 | A1* | 11/2016 | Oshima | G06F 3/0626 |
| 2018/0275916 | A1* | 9/2018 | Marinescu | G06F 3/0613 |
| 2019/0079681 | A1* | 3/2019 | Trika | G06F 3/0604 |
| 2020/0004429 | A1* | 1/2020 | Schmisseur | H04L 67/1097 |
| 2020/0210080 | A1* | 7/2020 | Palmer | G06F 3/0631 |

* cited by examiner

*Primary Examiner* — Chie Yew
(74) *Attorney, Agent, or Firm* — Joseph Mencher (57) ABSTRACT

A storage device includes a storage subsystem and a logical/physical storage location mapping database that maps LAAs to PAAs that identify physical locations in the storage subsystem. A storage controller receives a storage device mapping granularity configuration command from a host that identifies a number of LBAs to associate with a plurality of LAAs and, in response, associates each of the plurality of LAAs with the number of LBAs identified in the command. The storage controller then writes data to a PAA that includes a data size that is equal to a combined LBA size of the number of LBAs that were identified in the command and associated with each of the plurality of LAAs and maps, in the logical/physical storage location mapping database, the PAA to one of the plurality of LLAs that is associated the number of LBAs identified in the command.

20 Claims, 7 Drawing Sheets

STORAGE DEVICE CONFIGURABLE MAPPING GRANULARITY SYSTEM WHERE DATA IS WRITTEN WITHOUT PERFORMING READ-MODIFY-WRITE OPERATIONS

CROSS-REFERENCE TO RELATED APPLICATIONS

This application claims priority to Chinese Application Serial No. 201910675677.8 filed Jul. 25, 2019, the disclosure of which is incorporated herein by reference in its entirety.

BACKGROUND

The present disclosure relates generally to information handling systems, and more particularly to configuring mapping granularity for storage devices in information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often include storage devices such as, for example, Solid State Drive (SSD) storage devices that are used to store data. As would be appreciated by one of skill in the art, SSD storage devices store data in non-volatile memory devices such as NAND flash memory devices, and include an SSD controller that may utilize a Dual Data Rate (DDR) Dynamic Random Access Memory (DRAM) subsystem (typically DDR3 or DDR4) for the storage of management data used to manage those NAND flash memory devices. One of the management operations performed using management data stored on the DDR DRAM subsystem includes the mapping of logical storage locations associated with the SSD storage device to physical storage locations included in the NAND flash memory. As would be appreciated by one of skill in the art, such logical/physical storage location mappings may map Logical Allocation Addresses (LAAs) with Physical Allocation Addresses (PAAs), which allows the SSD controller receiving a data command (e.g., a write command) that is directed to an Logical Block Address (LBA) to identify the LAA associated with that LBA, and then determine the PAA that is mapped to that LAA and that identifies the physical location of the NAND flash memory in which that data is stored.

However, conventional mapping tables have a fixed mapping granularity that provides eight LBAs for each LAA that is mapped to a respective PAA, which can result in inefficiencies in the use of the mapping table that stores the logical/physical storage location mappings. For example, in the event data to be written to the SSD storage device is equal in size to eight LBAs, it may be written to a single PAA associated with the NAND flash memory devices, and a single LAA/PAA mapping entry may be provided in the mapping table that identifies the LAA that is associated with that PAA (and that is provided eight LBAs that are used to identify the logical storage location of that data.) However, in the event data to be written to the SSD storage device is greater in size than eight LBAs, it will be divided into data portions that are each equal in size to eight LBAs, and each of those data portion may be written to a respective PAA associated with the NAND flash memory devices, with multiple LAA/PAA mapping entries provided in the mapping table that each identify an LAA that is associated with each respective PAA (and that are each provided eight LBAs that define the logical storage location of a respective data portion.) As such, data that is equal in size to thirty-two LBAs will be divided into four eight-LBA sized data portions that are each written to a respective PAA associated with the NAND flash memory devices, and four mapping entries may be provided in the mapping table—one for each LAA that is associated with each of those respective PAAs (and each of which is provided eight LBAs that define the logical storage location of its respective eight-LBA sized data portion.) As such, for large data writes, the mapping table can grow very quickly, and has been found to occupy as much as 80% of the DDR DRAM subsystem in the SSD storage device.

Furthermore, such fixed mapping granularity also creates Read-Modify-Write (RMW) events. For example, when new data that is smaller in size than eight LBAs is used to modify existing data that is associated with a PAA in the NAND flash memory devices, all the existing data stored in association with that PAA must be read from the NAND flash memory devices, modified by writing the new data to the portion of that existing data that is being changed, and written back to the NAND flash memory devices. As would be appreciated by one of skill in the art, such RMW operations require additional SSD controller processing cycles that operate to reduce the performance of the SSD storage device, particularly relative to the situation where a modification to existing data in the NAND flash memory devices modifies all of that data (e.g., because the new data may simply be written directly to the NAND flash memory device that stores the existing data, rather than requiring the RMW operations discussed above.)

Accordingly, it would be desirable to provide a storage device mapping granularity system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a storage controller engine that is configured to: receive, from a host engine, a first storage device mapping granularity configuration command that identifies a first number of Logical Block Addresses (LBAs) to associate with a first plurality of Logical Allocation Addresses (LAAs); associate each of the first plurality of LAAs with the first number of LBAs identified in the first storage device mapping granularity configuration command; write, to a first Physical Allocation Address (PAA) that identifies a first physical location in a storage subsystem, first data that includes a first data size that is equal to a first combined LBA size of the first number of LBAs that were identified in the first storage device mapping granularity configuration command and associated with each of the first plurality of LAAs; and map, in a logical/physical storage location mapping database, the first PAA to a first LAA that is included in the first plurality of LLAs and that is associated the first number of LBAs identified in the first storage device mapping granularity configuration command.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
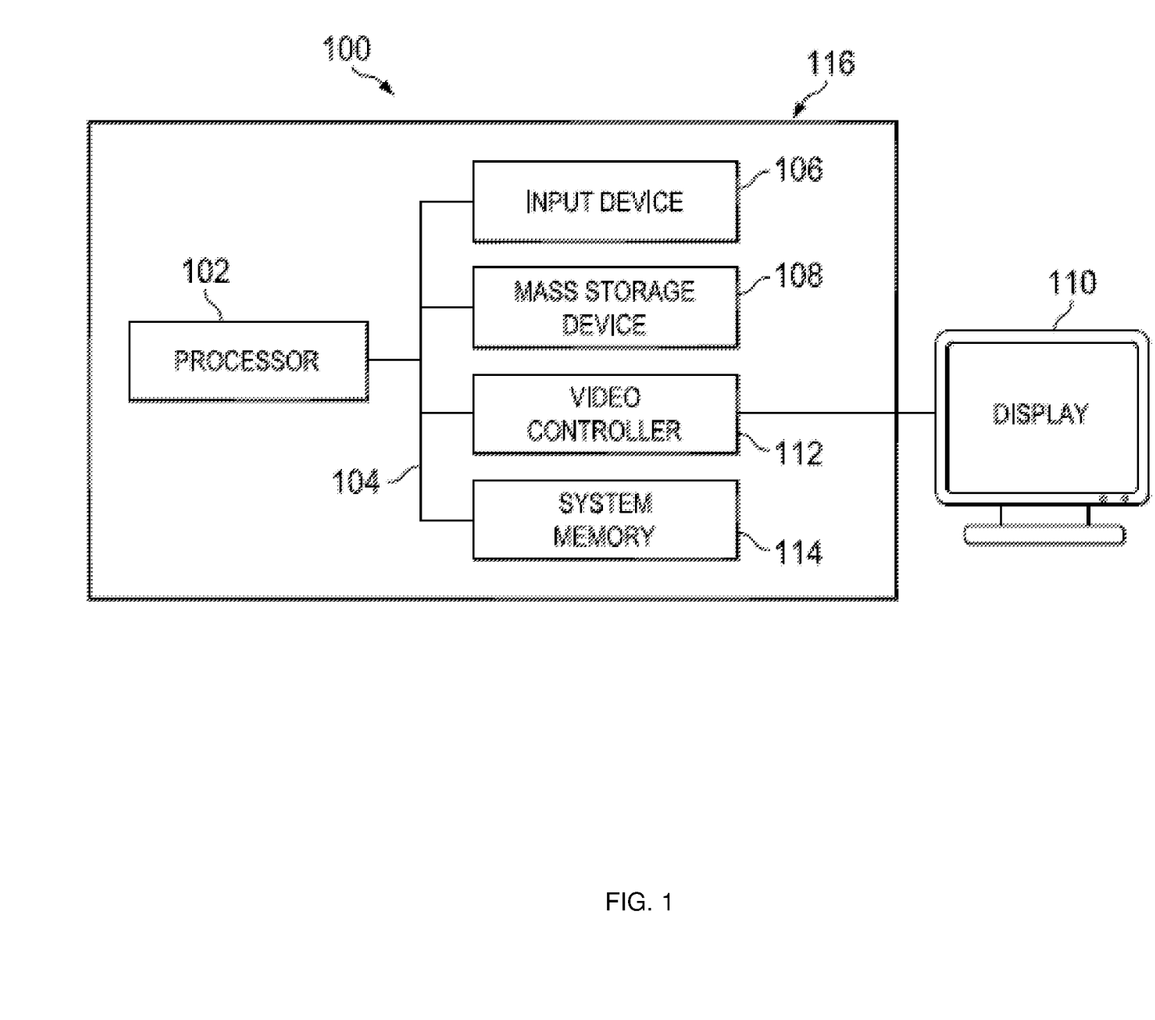
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
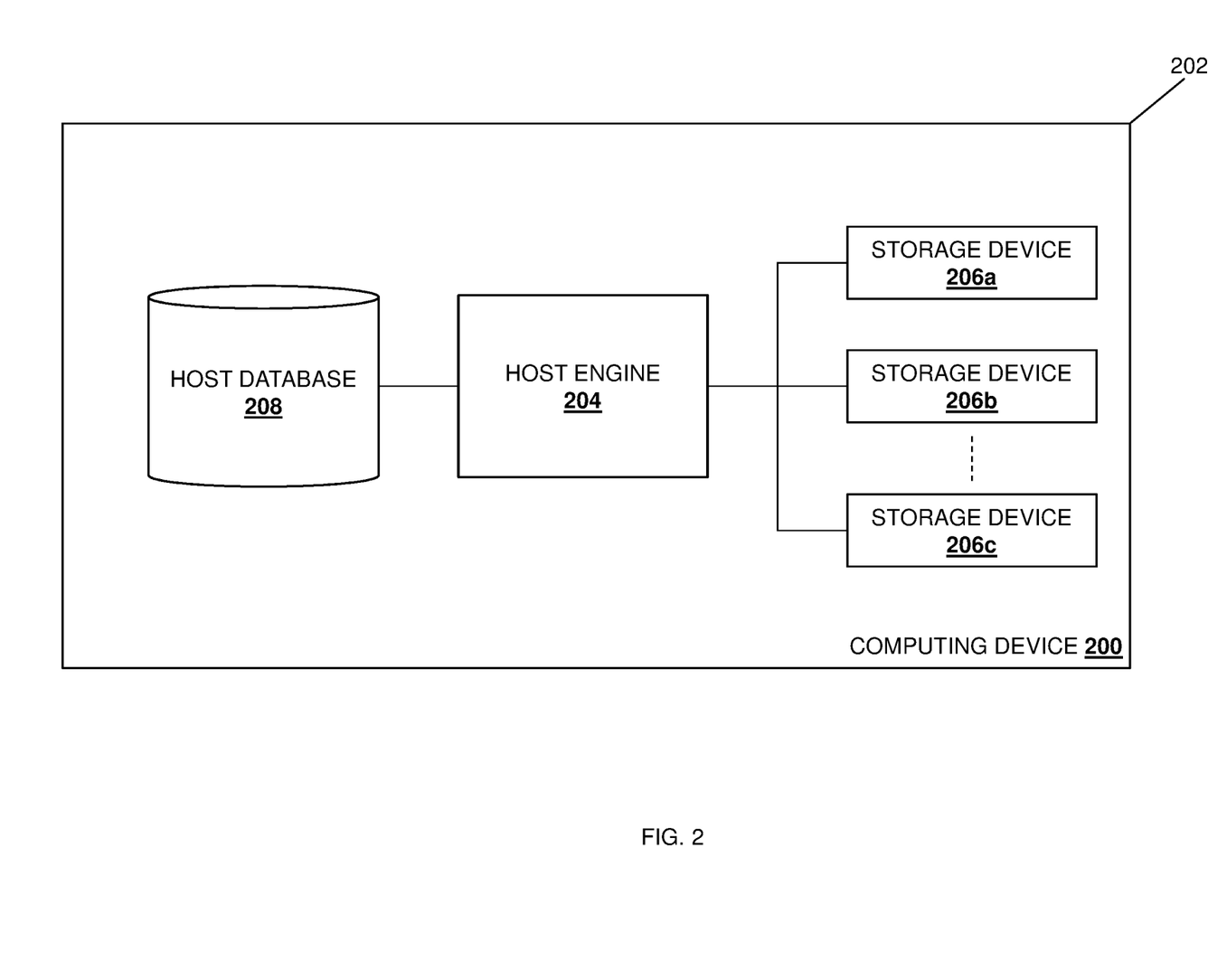
FIG. 2 is a schematic view illustrating an embodiment of a computing device that includes the storage device configurable mapping granularity system of the present disclosure.

Referring now to FIG. 2, an embodiment of a computing device 200 is illustrated. In an embodiment, the computing device 200 may be provided by the IHS 100 discussed above with reference to FIG. 1, and/or may include some or all of the components of the IHS 100. In the embodiments below, one of skill in the art in possession of the present disclosure will recognize that the computing device 200 is illustrated and discussed as a being provided by a server device, but will recognize that the computing device 200 may be provided by storage systems, desktop computing devices, laptop/notebook computing devices, and/or any other devices that may be configured to operate similarly as the computing device 200 discussed below. In the illustrated embodiment, the computing device 200 includes a chassis 202 that houses the components of the computing device 200, only some of which are illustrated below. However, while the components of the computing device 200 are illustrated as provided in the chassis 202, one of skill in the art in possession of the present disclosure will appreciate that the components illustrated in FIG. 2 (or similar components) may be distributed across different chassis while remaining within the scope of the present disclosure as well. In one example, the chassis 202 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a host engine 204 that is configured to perform the functionality of the host engines, hosts, and/or computing devices discussed below.

The chassis 202 may also house a storage system (not illustrated, but which may include the storage 108 discussed above with reference to FIG. 1) that is coupled to the host engine 204 (e.g., via coupling(s) between the storage system and the processing system) and that, in the illustrated embodiment, is provided by a plurality of storage devices 206a, 206b, and up to 206c. In the embodiments discussed below, the storage devices 206a-206c are provided by Solid State Drive (SSD) storage devices, but one of skill in the art in possession of the present disclosure will recognize that other types of storage devices may benefit from the teachings of the present disclosure, and those types of storage devices will fall within its scope as well. In the illustrated embodiment, the chassis 202 houses a host database 208 that is accessible by the host engine 204 and configured to store any of the information utilized by the host engine 204 discussed below. While a specific computing device 200 has been illustrated, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the functionality discussed below, while remaining within the scope of the present disclosure as well.

Figure 3:
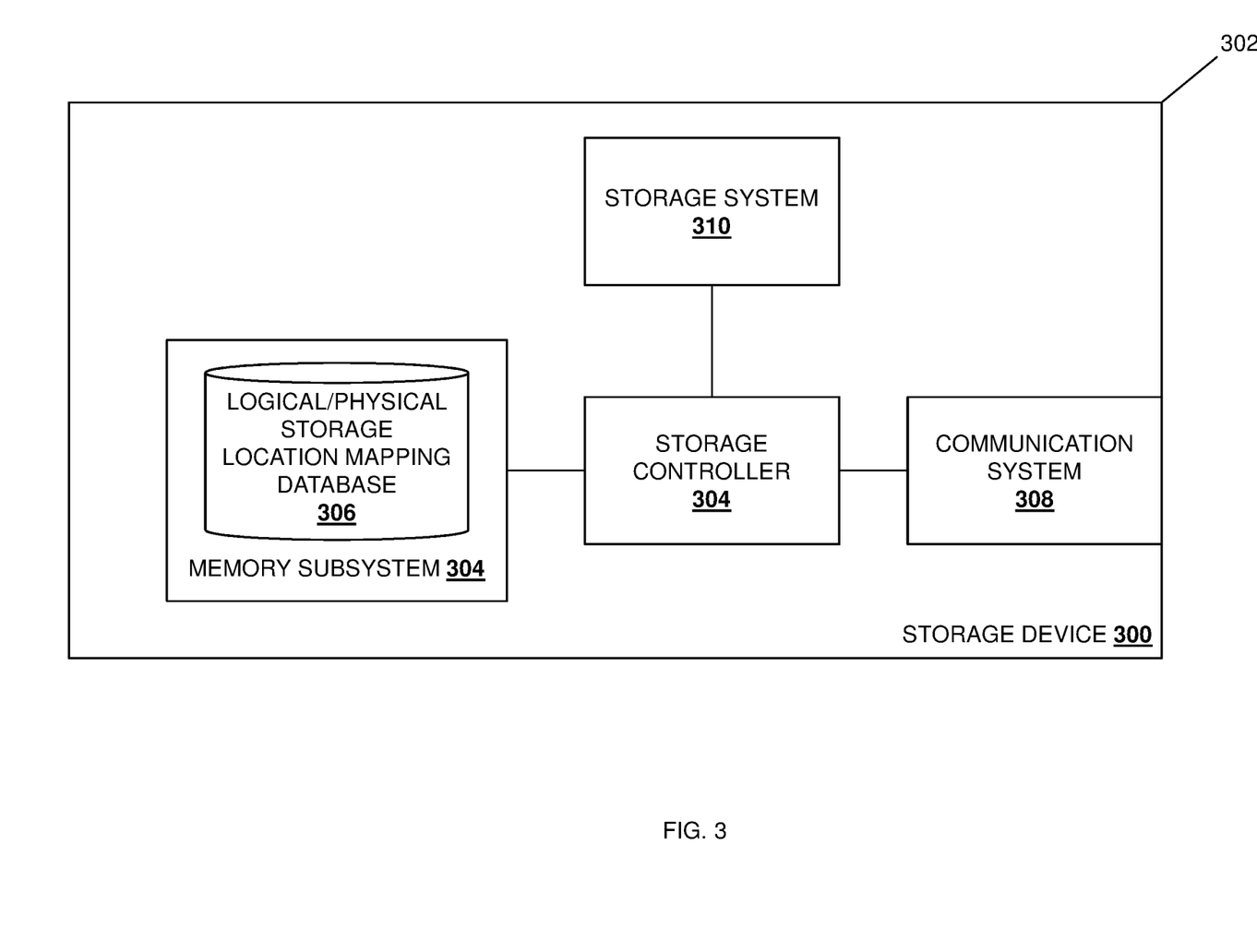
FIG. 3 is a schematic view illustrating an embodiment of a storage device that may be provided in the computing device of FIG. 2.

Referring now to FIG. 3, an embodiment of a storage device 300 is illustrated that may provide any or all of the storage devices 206a-206c discussed above with reference to FIG. 2. As such, the storage device 300 may be included in the IHS 100 discussed above with reference to FIG. 1, and in specific examples may be provided by an SSD storage device. However, while illustrated and discussed as an SSD storage device, one of skill in the art in possession of the present disclosure will recognize that the functionality of the storage device 300 discussed below may be provided by other storage devices that are configured to operate similarly as the storage device 300 discussed below. In the illustrated embodiment, the storage device 300 includes a chassis 302 that houses the components of the storage device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a storage controller 304 with a storage controller engine that is configured to perform the functionality of the storage controllers and/or storage devices discussed below. In the embodiments discussed below, the chassis 302 houses a memory subsystem 304 that is coupled to the storage controller 304 (e.g., via a coupling between the memory subsystem 304 and the processing system) and that includes a logical/physical storage location mapping database 306. As will be appreciated by one of skill in the art in possession of the present disclosure, the memory subsystem 304 may be part of the memory system that is utilized with the processing system to provide the storage controller 304, or may be a separate from that memory system, while remaining within the scope of the present disclosure as well. In a specific example, the memory subsystem 204 may be provided by DDR DRAM subsystem (s), although other memory subsystems will fall within the scope of the present disclosure as well.

The chassis 302 may also house a communication system 308 that is coupled to the storage controller 304 (e.g., via a coupling between the communication system 308 and the processing system) and that may be provided by any of a variety of storage controller communication components that one of skill in the art in possession of the present disclosure would recognize as providing for communications between the storage controller 304 and the host engine 204 discussed above with reference to FIG. 2. The chassis 302 may also house a storage subsystem 310 that is coupled to the storage controller 304 (e.g., via a coupling between the storage system 310 and the processing system) and that includes the storage components utilized in the storage device 300 to store data. For example, one of skill in the art in possession of the present disclosure will recognize that SSD storage device include storage systems provided by NAND flash memory devices, although the teachings of the present disclosure may benefit other types of storage devices as well. In particular examples, discussed below, one of skill in the art in possession of the present disclosure will recognize that the NAND flash memory devices in the storage subsystem 310 provide non-volatile memory that is distinct from the volatile memory provided by the DDR DRAM utilized with the memory subsystem 304. However, while a specific storage device 300 has been illustrated, one of skill in the art in possession of the present disclosure will recognize that storage devices (or other devices operating according to the teachings of the present disclosure in a manner similar to that described below for the storage device 300) may include a variety of components and/or component configurations for providing conventional storage device functionality, as well as the functionality discussed below, while remaining within the scope of the present disclosure as well.

Figure 4:
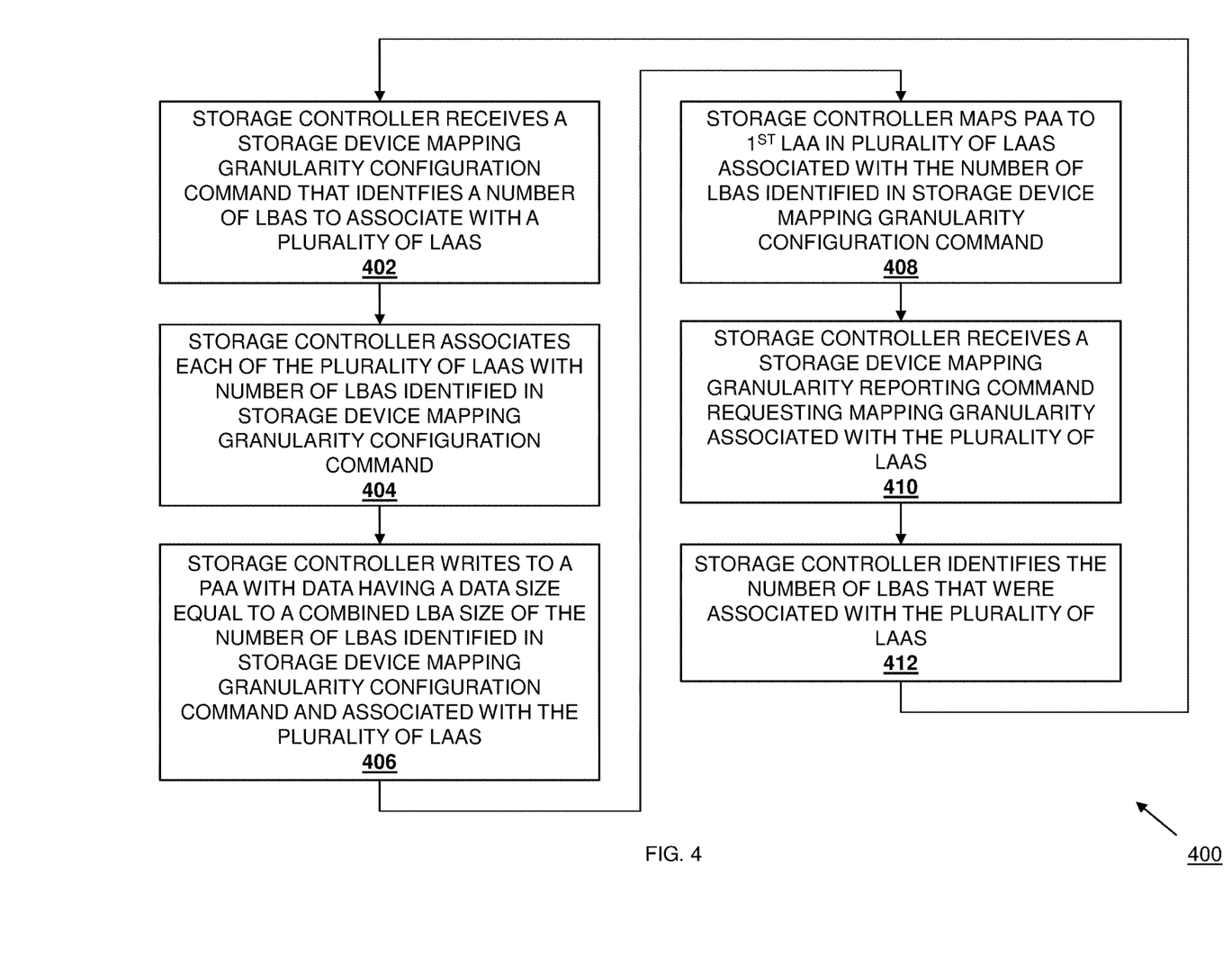
FIG. 4 is a flow chart illustrating an embodiment of a method for configuring a mapping granularity for a storage device.

Referring now to FIG. 4, an embodiment of a method 400 for configuring a mapping granularity for a storage device is illustrated. As discussed below, the systems and methods of the present disclosure provide the ability for a host to configure a mapping granularity associated with Logical Allocation Addresses (LAAs) and Logical Block Addresses (LBAs) in order to provide more efficient usage of mapping tables in an SSD storage device that map the LAAs to Physical Allocation Addresses (PAAs), while also reducing or even eliminating the need for Read-Modify-Write (RMW) operations that are required in conventional SSD storage devices when modifying data stored in a PAA that has a data size that is smaller than a number of LBAs associated with the LAA mapped to that PAA. For example, a storage controller in the SSD may receive a storage device mapping granularity configuration command from a host that identifies a number of Logical Block Addresses LBAs to associate with a plurality of LAAs, and may operate to associate each of the plurality of LAAs with the number of LBAs identified in the first storage device mapping granularity configuration command. As such, when the storage controller subsequently writes data to a PAA that includes a data size that is equal to a combined LBA size of the number of LBAs that were identified in the storage device mapping granularity configuration command and associated with each of the plurality of LAAs, it may map the PAA to a first LAA (which is included in the plurality of LLAs and which is associated the number of LBAs identified in the first storage device mapping granularity configuration command) with a single mapping entry in a mapping table. Furthermore, because the PAA is mapped to the first LAA that is associated with the number of LBAs having the combined LBA size that is equal to the data size of the data being written to that PAA, that data may be written directly to the NAND flash memory device identified by that PAA, rather than requiring the RMW operations discussed above. As such, more efficient use of the mapping tables, storage controller, and SDD storage device is enabled.

Figure 5:
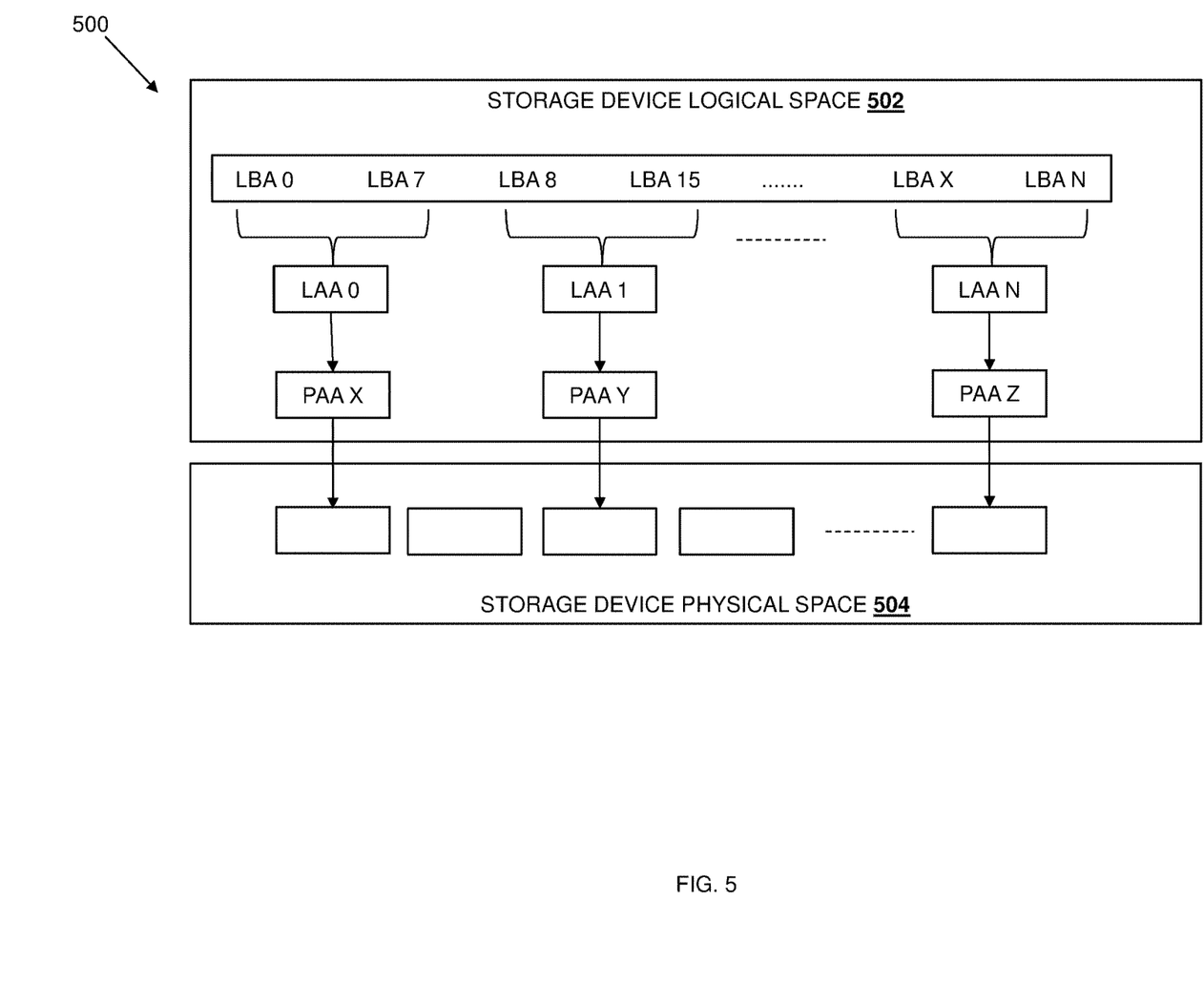
FIG. 5 is a schematic view illustrating an embodiment of logical/physical storage device mapping provided during the method of FIG. 4.

With reference to FIG. 5 and for the purposes of clarity with respect to the terms utilize in the discussions below, an embodiment of a plurality of logical/physical storage location mappings 500 that may be provided in the logical/physical storage location mapping database 306 in the memory subsystem 304 of the computing device 300 is illustrated. In the illustrated embodiment, the logical/physical storage location mappings 500 are illustrated as being provided for a storage device logical space 502 that is mapped to a storage device physical space 504 that may be included in the storage system 310 and provided by NAND flash memory devices in an SSD storage device, as discussed above. In the specific example illustrated in FIG. 5, the storage device logical space 502 includes a plurality of LBAs such as the LBA0, the LBA1, the LBA2, and up to the LBAN. Furthermore, as discussed above, groups of LBAs may be associated with respective LAAs in the storage device logical space 502, with FIG. 5 illustrating a conventional association of eight LBAs with each LAA (e.g., LBA0-LBA7 are associated with LAA0, LBA8-LBA15 are associated with LAA1, and so on.) Each LAA is further associated with a respective PAA in the storage device logical space 502 (e.g., LAA0 is associated with PAAX, LLA1 is associate with PAAY, and so on), with each PAA identifying a particular storage location in the storage device physical space 504 (e.g., in the NAND flash memory devices.) As will be appreciated by one of skill in the art in possession of the present disclosure in the art, storage locations in the NAND flash memory devices in an SSD storage device are conventionally provided in 4 KB "allocation units" or "page sizes". Furthermore, in conventional SSD storage devices, each PAA identifying one of those storage locations that are used to store data is mapped to a respective LAA as discussed above in a mapping table, and each of those LAA/PAA mappings may be considered to be associated with a "mapping granularity" of eight LBAs as illustrated in FIG. 5.

The method 400 begins at block 402 where a storage controller receives a storage device mapping granularity configuration command that identifies a number of Logical Block Addresses (LBAs) to associate with a plurality of Logical Allocation Addresses (LAAs). In an embodiment, at or before block 402, the host engine 204 may determine a desired mapping granularity for a logical/physical storage location mapping that will be used to store data. For example, the host engine 204 may identify a data size for a plurality of data that is to-be written to the storage subsystem 310 in the storage device 206a/300, identify a combined LBA size of a number of LBAs that are equal to that data size, and determine a desired mapping granularity based on that number of LBAs. As will be appreciated by one of skill in the art in possession of the present disclosure, the storage devices 206a-206c and/or storage subsystem 310 in those storage devices may provide a plurality of namespaces, and the host engine 204 may select a namespace to which data will be written, and then determine the desired mapping granularity for that namespace as discussed above. As discussed in further detail below, different mapping granularities may be determined for the different namespaces provided by the storage devices 206a-206c and/or storage subsystem 310 in those storage devices, and thus data of different sizes may be written to namespaces with mapping granularities that are determined based on that data/those data sizes.

As such, in some examples, the host engine 204 may identify that a plurality of data, which is to-be written to the storage subsystem 310 in the storage device 206a/300, includes a data size that is equal to one LBA and, in response, may determine a desired mapping granularity of one LBA to each LAA. Similarly, in some examples, the host engine 204 may identify that a plurality of data, which is to-be written to the storage subsystem 310 in the storage device 206a/300, includes a data size that is equal to two LBAs and, in response, may determine a desired mapping granularity of two LBAs to each LAA. Similarly, in some examples, the host engine 204 may identify that a plurality of data, which is to-be written to the storage subsystem 310 in the storage device 206a/300, includes a data size that is equal to four LBAs and, in response, may determine a desired mapping granularity of four LBAs to each LAA. Similarly, in some examples, the host engine 204 may identify that a plurality of data, which is to-be written to the storage subsystem 310 in the storage device 206a/300, includes a data size that is equal to eight LBAs and, in response, may determine a desired mapping granularity of eight LBAs to each LAA.

Similarly, in some examples, the host engine 204 may identify that a plurality of data, which is to-be written to the storage subsystem 310 in the storage device 206a/300, includes a data size that is equal to sixteen LBAs and, in response, may determine a desired mapping granularity of sixteen LBAs to each LAA. Similarly, in some examples, the host engine 204 may identify that a plurality of data, which is to-be written to the storage subsystem 310 in the storage device 206a/300, includes a data size that is equal to thirty two LBAs and, in response, may determine a desired mapping granularity of thirty two LBAs to each LAA. One of skill in the art in possession of the present disclosure will recognize that the conventional mapping granularity of eight LBAs to each LAA discussed above may be provided as a default mapping granularity, and thus a determination of a desired mapping granularity of eight LBAs to each LAA may not require the mapping granularity configuration operations discussed below. However, one of skill in the art in possession of the present disclosure will also recognize that any mapping granularity may be provided as a default for a namespace, and any desired mapping granularity (e.g., that is different than the specific examples of desired mapping granularities detailed above) may be determined while remaining within the scope of the present disclosure as well.

Thus, in an embodiment, at block 404 the host engine 204 may generate a storage device mapping granularity configuration command that identifies the desired mapping granularity discussed above, and may transmit that storage device mapping granularity configuration command to the storage device 206a/300. However, while discussed as being transmitted to the storage device 206a/300, one of skill in the art in possession of the present disclosure will appreciate that storage device mapping granularity configuration commands may be transmitted to any of the storage devices 206-206c while remaining within the scope of the present disclosure as well. As such, at block 404, the storage controller 304 in the storage device 206a/300 may receive the storage device mapping granularity configuration command via the communication system 308. In some embodiments, the storage device mapping granularity configuration command may be provided by a Granularity Set (GR_Set) command that may be received by the storage controller 304 via a GR_Set command interface that is provided in firmware in the storage device 206a/300 and that operates to open namespaces provided by that storage device 206a/300 to the GR_Set commands of the present disclosure. As will be appreciated by one of skill in the art in possession of the present disclosure, the GR_Set command may be provided using the Opcodes for Admin Commands functionality defined in the NVMe specification, and/or via any other technique known in the art.

The method 400 then proceeds to block 404 where the storage controller associates each of the plurality of LAAs with the number of LBAs identified in the storage device mapping granularity configuration command. In an embodiment, at block 404 and in response to receiving the storage device mapping granularity configuration command at block 402, the storage controller 304 in the storage device 202a may operate to associate each of the plurality of LAAs identified in the storage device mapping granularity configuration command (e.g., each of the plurality of LAAs for a namespace identified in the storage device mapping granularity configuration command) with the mapping granularity identified in the storage device mapping granularity configuration command (e.g., the number of LBAs identified in the storage device mapping granularity configuration command).

In a specific example, at block 404, the storage controller 304 may parse (e.g., via the GR_Set command interface that is provided in firmware in the storage device 206a/300 and that operates to open namespaces provided by that storage device 206a/300 to the GR_Set commands of the present disclosure) the storage device mapping granularity configuration command (e.g., the GR_Set command) to identify the namespace and the mapping granularity provided therein, and save that mapping granularity in a namespace table in association with that namespace. As such, the plurality of LAAs provided for that namespace are associated with the number of LBAs identified in the desired mapping granularity in that namespace table. Following the saving of the mapping granularity in the namespace table in association with the namespace, the namespace table may be stored in association with a mapping table for that namespace in the logical/physical storage location mapping database 306 provided by the memory subsystem 304, which operates to set the mapping granularity for LAA mapped to a PAA as requested by the host engine 204. Furthermore, in some embodiments that namespace table may also be saved to the storage subsystem 310. For example, one of skill in the art in possession of the present disclosure will recognize that the storage subsystem 310 may include NAND memory devices provided for the storage of host/user data, and NAND memory devices provided for the storage of Flash Translation Layer (FTL) information, and how a copy of the namespace table may be stored as part of the FTL information in order to, for example, allow that namespace table to be loaded from the storage subsystem 310 and into the logical/physical storage location mapping database 306 provided by the memory subsystem 304 on subsequent power on, reset, and/or other initialization operations for the computing device 200, an embodiment of which is discussed in further detail below.

The method 400 then proceeds to block 406 where the storage controller writes to a Physical Allocation Address (PAA) with data having a data size that is equal to a combined LBA size of the number of LBAs that was identified in the storage device mapping granularity configuration command and that was associated with each of the plurality of LAAs. In an embodiment, at block 406 and subsequent to setting the mapping granularity for the namespace as discussed above, the storage controller 304 in the storage device 206a/300 may receive data via its communication system 308 for writing to the storage subsystem 310 and, in response, may write that data to a PAA that defines a storage location in the storage subsystem 310. As discussed above, the configuration of mapping granularity for the namespace at block 404 may have been performed based on the particular size of data that is to-be written to that namespace and, as such, the receiving of that data may cause the storage controller 304 to identify the namespace for which it configured the mapping granularity to store that data, identify a PAA that identifies a storage location provided by that namespace, and store the data in the storage location identified by that PAA.

As such, at block 406, the storage controller 304 may receive data having a data size that is equal to one LBA, and may write that data in a PAA associated with a namespace that was configured at block 406 with a mapping granularity of one LBA to each LAA provided for that namespace. Similarly, at block 406, the storage controller 304 may receive data having a data size that is equal to two LBAs, and may write that data in a PAA associated with a namespace that was configured at block 406 with a mapping granularity of two LBAs to each LAA provided for that namespace. Similarly, at block 406, the storage controller 304 may receive data having a data size that is equal to four LBAs, and may write that data in a PAA associated with a namespace that was configured at block 406 with a mapping granularity of four LBAs to each LAA provided for that namespace. Similarly, at block 406, the storage controller 304 may receive data having a data size that is equal to eight LBAs, and may write that data in a PAA associated with a namespace that was configured at block 406 with a mapping granularity of eight LBAs to each LAA provided for that namespace.

Similarly, at block 406, the storage controller 304 may receive data having a data size that is equal to sixteen LBAs, and may write that data in a PAA associated with a namespace that was configured at block 406 with a mapping granularity of sixteen LBAs to each LAA provided for that namespace. Similarly, at block 406, the storage controller 304 may receive data having a data size that is equal to thirty two LBAs, and may write that data in a PAA associated with a namespace that was configured at block 406 with a mapping granularity of thirty two LBAs to each LAA provided for that namespace. However, while of variety of specific examples have been provided, one of skill in the art in possession of the present disclosure will recognize that data may be written to the storage system 310 that was configured with any mapping granularity while remaining within the scope of the present disclosure as well.

The method 400 then proceeds to block 408 where the storage controller maps the PAA to a first LAA that is included in the plurality of LAAs that were associated with the number of LBAs identified in the storage device mapping granularity configuration command. In an embodiment, at block 408, the storage controller 304 may operate to map the PAA to which the data was written to at block 406 to one of the plurality of LAAs associated with the namespace associated with that PAA. For example, with reference to FIG. 6, an embodiment of a logical/physical storage location mapping 600 is illustrated that may be provided in the logical/physical storage location mapping database 306 in the memory subsystem 304 of the computing device 300 at block 408. Similarly as described above with the logical/physical storage location mappings 500 of FIG. 5, the logical/physical storage location mapping 600 is illustrated having a storage device logical space 602 that may be mapped to a storage device physical space 604 that may be included in the storage system 310 and provided by NAND flash memory devices in an SSD storage device. In the specific example illustrated in FIG. 6, the storage device logical space 602 includes a plurality of LBAs including a LBA0, a LBA1, a LBA2, and up to a LBAN, and a mapping granularity of thirty two LBAs to each LAA has been provided according to the method 400.

Figure 6:
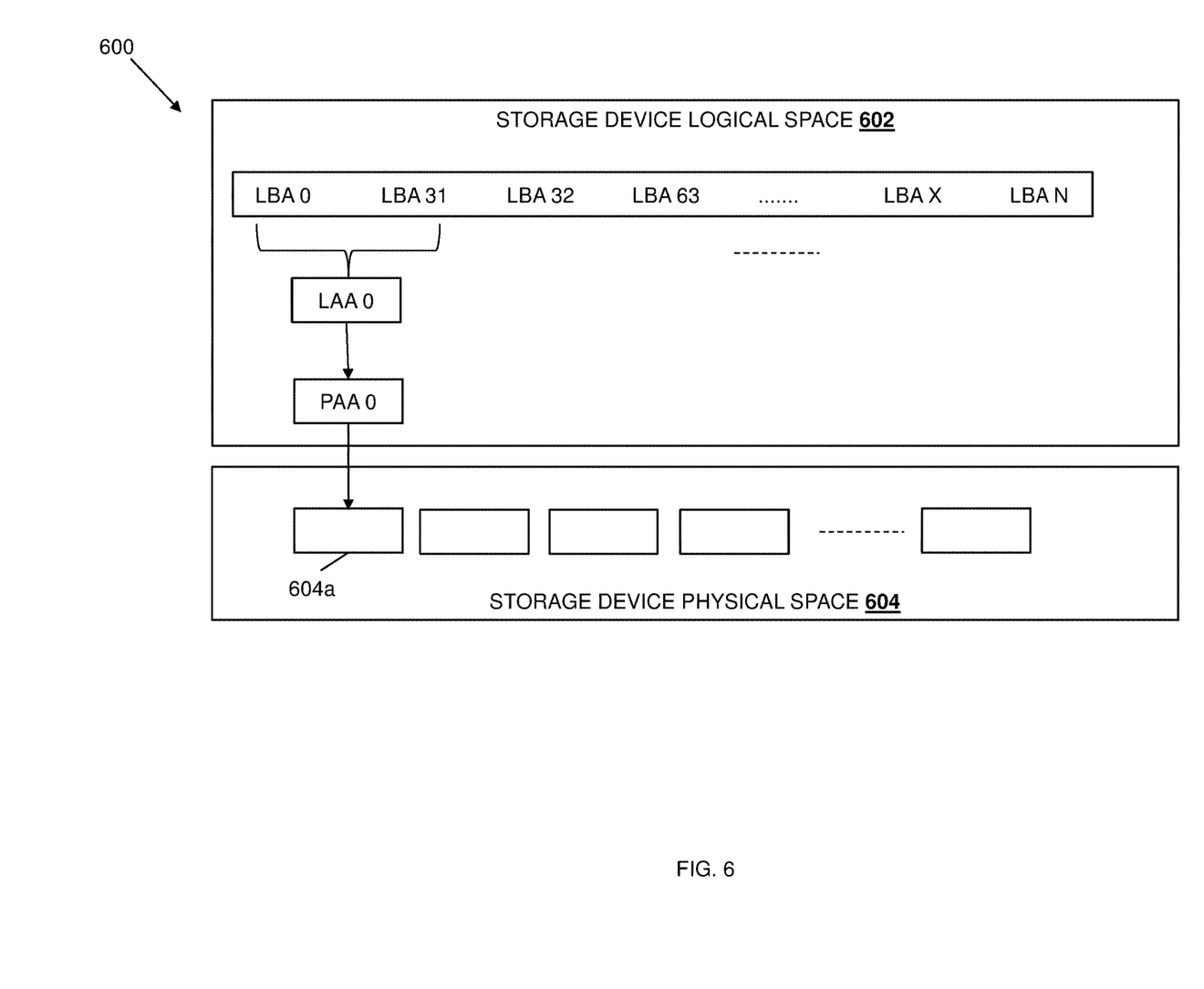
FIG. 6 is a schematic view illustrating an embodiment of logical/physical storage device mapping provided during the method of FIG. 4.

As such, at block 406, data that is equal in size to thirty two LBAs is written to a storage device physical location 604a in the storage device physical space 604 that is identified by PAA0, and at block 408 the storage controller maps PAA0 to LAA0 that is associated with third two LBAs (LBA0-LBA31). As will be appreciated by one of skill in the art in possession of the present disclosure in the art, the mapping of the PAA to the LAA in such as situation requires only a single mapping entry such as the mapping entry in the portion of the mapping table below:

| LOGICAL ALLOCATION ADDRESS | PHYSICAL ALLOCATION ADDRESS |
|---|---|
| LAA0 | PAA0 |

As will be appreciated by one of skill in the art in possession of the present disclosure, the ability to provide the mapping entry as a single entry is enabled by the mapping granularity of thirty two LBAs to LAA0, which provides a combined LBA size that is equal to the size of the data being written to the PAA0 as provided in this example. To contrast, conventional mapping granularities of eight LBAs to each LAA would require that that data be broken up into four eight-LBA sized portions and written to four PAAs, thus requiring four mapping entries (e.g., one for each PAA/LAA combination.) However, while a particular mapping granularity of thirty two LBAs to each LAA has been described, one of skill in the art in possession of the present disclosure will recognize that other mapping granularities will provide similar benefits as well.

Figure 7:
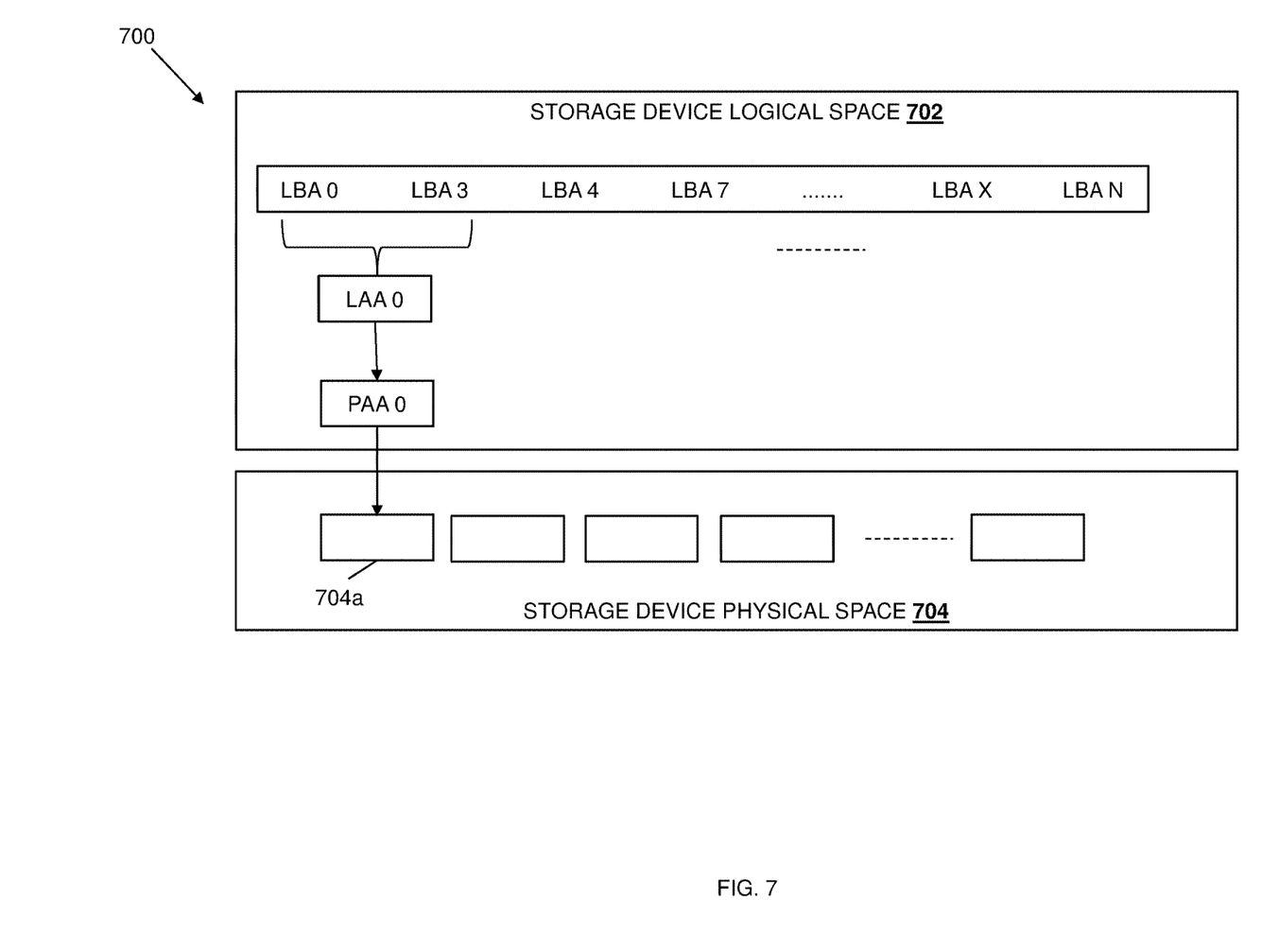
FIG. 7 is a schematic view illustrating an embodiment of logical/physical storage device mapping provided during the method of FIG. 4.

In another example, with reference to FIG. 7, an embodiment of a logical/physical storage location mapping 700 is illustrated that may be provided in the logical/physical storage location mapping database 306 in the memory subsystem 304 of the computing device 300 at block 408. Similarly as described above with the logical/physical storage location mappings 500 of FIG. 5, the logical/physical storage location mapping 600 is illustrated having a storage device logical space 702 that may be mapped to a storage device physical space 704 that may be included in the storage system 310 and provided by NAND flash memory devices in an SSD storage device. In the specific example illustrated in FIG. 7, the storage device logical space 702 includes a plurality of LBAs including a LBA0, a LBA1, a LBA2, and up to a LBAN, and a mapping granularity of four LBAs to each LAA has been provided according to the method 400. As such, at block 406, data that is equal in size to four LBAs is written to a storage device physical location 604a in the storage device physical space 604 that is identified by PAA0, and at block 408 the storage controller maps PAA0 to LAA0 that is associated with four LBAs (LBA0-LBA3). As will be appreciated by one of skill in the art in possession of the present disclosure in the art, the mapping of the PAA to the LAA in such as situation requires only a single mapping entry similarly as discussed above:

Furthermore, as will also be appreciated by one of skill in the art in possession of the present disclosure, namespaces may be provided for data with relatively small data sizes by configuring those namespaces with relatively small mapping granularities (e.g., the four LBAs to each LAA mapping granularity illustrated in FIG. 7) in order to reduce and/or eliminate the need for the RMW operations discussed above. For example, the data written to the storage device physical location 604a in the storage device physical space 604 that is identified by PAA0 and includes a data size equal to four LBAs may be modified by simply writing new data to that storage device physical location 604a (e.g., the NAND flash memory device identified by PAA0) that has a data size equal to four LBAs. To contrast with conventional mapping granularities of eight LBAs to each LAA, the writing of new data having a data size equal to four LBAs would require the reading of the eight-LBA sized existing data from the storage device physical location identified by the PAA, the modification of that existing data with the new data to provide modified data, and the writing of that eight-LBA sized modified data back to the storage device physical location identified by the PAA. As such, resources of the storage controller 304 may be conserved via the mapping granularity configuration of the present disclosure.

The method 400 then proceeds to block 410 where the storage controller receives a storage device mapping granularity reporting command that requests a mapping granularity associated with the plurality of LAAs. In an embodiment, at block 410, the host engine 204 may generate a storage device mapping granularity reporting command that requests the mapping granularity associated with any namespace provide by the storage subsystem 310 in a storage device 206-206c, and transmit that storage device mapping granularity reporting command to the storage device(s) 206a-206c. For example, during power on, reset, and/or other initialization operations for the computing device 200, the host engine 204 may operate to request a mapping granularity associated with any namespace provided by the storage devices 206a-206c. As such, at block 404, the storage controller 304 in the storage device 300 may receive the storage device mapping granularity reporting command via the communication system 308. Similarly as described below for the GR-Set command, the storage device mapping granularity configuration command may be provided by a Granularity Get (GR_Get) command that may be received by the storage controller 304 via a GR_Get command interface that is provided in firmware in the storage device 300 and that operates to open namespaces provided by that storage device 300 to the GR_Get commands of the present disclosure. As will be appreciated by one of skill in the art in possession of the present disclosure, the GR_Get command may be provided using the Opcodes for Admin Commands functionality defined in the NVMe specification, and/or via any other technique known in the art.

The method 400 then proceeds to block 412 where the storage controller identifies the number of LBAs that were associated with the plurality of LAAs. In an embodiment, at block 412 and in response to receiving the storage device mapping granularity reporting command at block 412, the storage controller 304 in the storage device 202a may operate to retrieve the namespace table that was stored in the storage subsystem 310 (e.g., in the FTL information in the NAND flash memory devices as discussed above), and provide that namespace table in the logical/physical storage location mapping database 306 in the memory subsystem 304. The storage controller 304 may then access the namespace identified in the storage device mapping granularity reporting command, retrieve the mapping granularity associated with that namespace, and transmit that mapping granularity to the host engine 204. As will be appreciated by one of skill in the art in possession of the present disclosure, the host engine 204 may then provide that mapping granularity for display to a user, and/or use that mapping granularity to perform a variety of other actions known in the art.

The method 400 may then return to block 402 such that the method 400 may repeat. As such, different namespaces provided by the storage system(s) 310 in the storage device(s) 206a-206c/300 may be configured with different mapping granularities based on, for example, the data sizes of data that will be stored in those namespaces, and/or any other considerations that would be apparent to one of skill in the art in possession of the present disclosure. As such, the host engine 204 may attempt to optimize the data processing operations of storage controllers in the storage devices 206a-206c, reduce mapping table sizes in the storage devices 206a-206c, and/or provide a variety of other benefits that would be apparent to one of skill in the art in possession of the present disclosure. For example, hosts that process relatively larger sized data may configure a higher percentage of their accessible namespaces with relatively large mapping granularities, while hosts that process relatively smaller sized data may configure a higher percentage of their accessible namespaces with relatively small mapping granularities. Furthermore, hosts that process data of various sizes may configure mapping granularity according to tiers such as those illustrated in the table below:

| PERCENTAGE OF NAMESPACES | NAMESPACE GRANULARITY |
| --- | --- |
| 10% | 32X LBA |
| 20% | 16X LBA |
| 50% | 8X LBA |
| 15% | 4X LBA |
| 5% | 1X LBA |

In some embodiments, the systems and methods of the present disclosure may be implemented with modifications to the data structure of PAAs in order to, for example, ensure that wear leveling algorithms may function correctly. For example, some wear leveling algorithms require fixed sized NAND memory devices, and thus the data structure for the PAAs of the present disclosure may be modified to ensure that the wear level operation unit is a full payload. For example, each data payload stored in an PAA may be associated with metadata that includes information associated with the namespace that stores that data (e.g., a namespace identifier), the LAA associated with the PAA that identifies where that data is stored (e.g., the LAA value), a payload count, and a payload offset (along with Error Correction Code (ECC) information). As such, each NAND memory device (e.g., an allocation unit or page) may store the following data in the table below:

| PAYLOAD PORTION | META DATA | PAYLOAD PORTION | META DATA | PAYLOAD PORTION | META DATA | PAYLOAD PORTION | META DATA |
| --- | --- | --- | --- | --- | --- | --- | --- |

Furthermore, as discussed, each meta data portion stored in the NAND memory device (e.g., the allocation unit or page) as detailed in the table above may include the following data in the table below:

| NAMESPACE IDENTIFIER | LAA VALUE | PAYLOAD COUNT | PAYLOAD OFFSET |
| --- | --- | --- | --- |

As will be appreciated by one of skill in the art in possession of the present disclosure, for each data operation (e.g., Read, Write, Erase operations) that is part of a wear leveling operation, the payload counts/offsets may be checked in order to ensure that a full payload is being operated on, and that no interference exists between different namespaces. For example, the four payload portions and their associated metadata above may include the information in the table below:

| NAMESPACE IDENTIFIER | LAA VALUE | PAYLOAD COUNT | PAYLOAD OFFSET |
| --- | --- | --- | --- |
| 3 | 100 | 4 | 0 |
| 3 | 100 | 4 | 1 |
| 3 | 100 | 4 | 2 |
| 3 | 100 | 4 | 3 |

As such, the metadata in the four payload portions identifies that each is associated with the same namespace, LAA, and payload, and are provided in a particular order (e.g., 0-3 according to the payload offset values.)

Thus, systems and methods have been described that provide the ability for a host to configure a mapping granularity associated with logical storage location identifiers in order to provide more efficient usage of mapping tables in a storage device that map the logical storage location identifiers to physical storage location identifiers, and reduce or eliminate the need for Read-Modify-Write (RMW) operations that are required in conventional storage devices when modifying data that is stored in a physical location and that has a data size that is smaller than a mapping granularity associated with the logical identifiers that are mapped to the physical identifier that identifies that physical location. For example, a storage controller in a storage device may receive a configuration command from a host that identifies a number of LBAs to associate with a plurality of LAAs, and may operate to associate each of the plurality of LAAs with the number of LBAs identified in the configuration command. As such, when the storage controller subsequently writes data to a PAA that includes a data size that is equal to a combined LBA size of the number of LBAs that were identified in the configuration command and associated with each of the plurality of LAAs, it may map the PAA to a first LAA that is included in the plurality of LLAs and that is associated the number of LBAs identified in the configuration command with a single mapping entry in a mapping table. Furthermore, because the PAA is mapped to the first LAA that is associated with the number of LBAs having the combined LBA size that is equal to the data size of the data being written to that PAA, that data may be written directly to the NAND flash memory device identified by that PAA, rather than requiring the RMW operations discussed above. As such, more efficient use of the mapping tables, storage controller, and storage device is enabled Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A storage device, comprising:
a storage subsystem;
a logical/physical storage location mapping database that is configured to map Logical Allocation Addresses (LAAs) to Physical Allocation Addresses (PAAs) that identify physical locations in the storage subsystem;
and a storage controller that is coupled to the storage subsystem and the logical/physical storage location mapping database, wherein the storage controller is configured to:
receive, from a host engine, a first storage device mapping granularity configuration command that identifies a first number of Logical Block Addresses (LBAs) to associate with a first plurality of LAAs;
associate each of the first plurality of LAAs with the first number of LBAs identified in the first storage device mapping granularity configuration command;
identify first data that has been provided for writing to the storage subsystem and that includes a first data size that is equal to a first combined LBA size of the first number of LBAs;
map, in the logical/physical storage location mapping database, a first PAA to a first LAA that is included in the first plurality of LAAs and that is associated with the first number of LBAs identified in the first storage device mapping granularity configuration command;
and write, without performing Read-Modify-Write (RMW) operations, the first data directly to a first physical location, in the storage subsystem, that is identified by the first PAA that was mapped to the first LAA.

2. The system of claim 1, wherein the storage controller is configured to:
receive, from the host engine, a second storage device mapping granularity configuration command that identifies a second number of LBAs to associate with a second plurality of LAAs, wherein the second number of LBAs is different than the first number of LBAs;
associate each of the second plurality of LAAs with the second number of LBAs identified in the second storage device mapping granularity configuration command;
identify second data that has been provided for writing to the storage subsystem and that includes a second data size that is equal to a second combined LBA size of the second number of LBAs;
map, in the logical/physical storage location mapping database, a second PAA to a second LAA that is included in the second plurality of LAAs and that is associated with the second number of LBAs identified in the second storage device mapping granularity configuration command;
and write, without performing RMW operations, the second data to a second physical location, in the storage subsystem, that is identified by the second PAA that was mapped to the second LAA.

3. The system of claim 2, wherein the first plurality of LAAs are associated with a first namespace that is provided by the storage subsystem, and the second plurality of LAAs are associated with a second namespace that is provided by the storage subsystem and that is different than the first namespace.

4. The system of claim 1, wherein the storage controller is configured to:
receive, from the host engine, a storage device mapping granularity reporting command that requests a mapping granularity associated with the first plurality of LAAs; and
identify, to the host engine, the first number of LBAs that were associated with each of the first plurality of LAAs.

5. The system of claim 1, wherein the storage subsystem includes NAND flash memory devices.

6. The system of claim 1, wherein the storage controller is configured to:
associate, in a mapping granularity table, the first plurality of LAAs with the first number of LBAs identified in the first storage device mapping granularity configuration command; and
save the mapping granularity table in the storage subsystem.

7. An Information Handling System (IHS), comprising:
a processing system;
and a memory system that is coupled to the processing system and that includes instructions that, when executed by the processing system, cause the processing system to provide a storage controller engine that is configured to:
receive, from a host engine, a first storage device mapping granularity configuration command that identifies a first number of Logical Block Addresses (LBAs) to associate with a first plurality of Logical Allocation Addresses (LAAs);
associate each of the first plurality of LAAs with the first number of LBAs identified in the first storage device mapping granularity configuration command;
identify first data that has been provided for writing to a storage subsystem and that includes a first data size that is equal to a first combined LBA size of the first number of LBAs;
map, in a logical/physical storage location mapping database, a first Physical Allocation Address (PAA), that identifies a first physical location in the storage subsystem, to a first LAA that is included in the first plurality of LAAs and wherein the first LAA is associated with the first number of LBAs identified in the first storage device mapping granularity configuration command;
and write, without performing Read-Modify-Write (RMW) operations, the first data directly to the first physical location, in the storage subsystem, that is identified by the first PAA that was mapped to the first LAA.

8. The IHS of claim 7, wherein the storage controller engine is configured to:
receive, from the host engine, a second storage device mapping granularity configuration command that identifies a second number of LBAs to associate with a second plurality of LAAs, wherein the second number of LBAs is different than the first number of LBAs;
associate each of the second plurality of LAAs with the second number of LBAs identified in the second storage device mapping granularity configuration command;
identify second data that has been provided for writing to the storage subsystem and that includes a second data size that is equal to a second combined LBA size of the second number of LBAs;
and map, in the logical/physical storage location mapping database, a second PAA, that identifies a second physical location in the storage subsystem, to a second LAA that is included in the second plurality of LAAs and wherein the second LAA is associated with the second number of LBAs identified in the second storage device mapping granularity configuration command;

and write, without performing RMW operations, the second data directly to the second physical locations the storage subsystem, that is identified by the second PAA that was mapped to the second LAA.

9. The IHS of claim 8, wherein the first plurality of LAAs are associated with a first namespace that is provided by the storage subsystem, and the second plurality of LAAs are associated with a second namespace that is provided by the storage subsystem and that is different than the first namespace.

10. The IHS of claim 7, wherein the storage controller engine is configured to:
receive, from the host engine, a storage device mapping granularity reporting command that requests a mapping granularity associated with the first plurality of LAAs; and
identify, to the host engine, the first number of LBAs that were associated with each of the first plurality of LAAs.

11. The IHS of claim 7, wherein the storage subsystem includes NAND flash memory devices.

12. The IHS of claim 7, wherein the storage controller engine is configured to:
associate, in a mapping granularity table, the first plurality of LAAs with the first number of LBAs identified in the first storage device mapping granularity configuration command; and
save the mapping granularity table in the storage subsystem.

13. The IHS of claim 12, wherein the mapping granularity table is a namespace table and the first plurality of LAAs are associated with a first namespace identified in the namespace table.

14. A method for configuring a mapping granularity for a storage device, comprising:
receiving, by a storage controller from a host engine, a first storage device mapping granularity configuration command that identifies a first number of Logical Block Addresses (LBAs) to associate with a first plurality of Logical Allocation Addresses (LAAs);
associating, by the storage controller, each of the first plurality of LAAs with the first number of LBAs identified in the first storage device mapping granularity configuration command;
identifying, by the storage controller, first data that has been provided for writing to a storage subsystem and that includes a first data size that is equal to a first combined LBA size of the first number of LBAs;
mapping, by the storage controller in a logical/physical storage location mapping database, a first PAA to a first LAA that is included in the first plurality of LAAs and that is associated with the first number of LBAs identified in the first storage device mapping granularity configuration command;

and writing, by the storage controller without performing Read-Modify-Write (RMW) operations, the first data directly to a first physical location, in the storage subsystem, that is identified by the first PAA that was mapped to the first LAA.

15. The method of claim 14, further comprising:
receiving, by the storage controller from the host engine, a second storage device mapping granularity configuration command that identifies a second number of LBAs to associate with a second plurality of LAAs, wherein the second number of LBAs is different than the first number of LBAs;
associating, by the storage controller, each of the second plurality of LAAs with the second number of LBAs identified in the second storage device mapping granularity configuration command;
identifying, by the storage controller, second data that has been provided for writing to the storage subsystem and that includes a second data size that is equal to a second combined LBA size of the second number of LBAs;
and mapping, by the storage controller in the logical/physical storage location mapping database, a second PAA to a second LAA that is included in the second plurality of LAAs and that is associated with the second number of LBAs identified in the second storage device mapping granularity configuration command;
and writing, by the storage controller without performing RMW operations, the second data directly to a second physical location, in the storage subsystem, that is identified by the second PAA that was mapped to the second LAA.

16. The method of claim 15, wherein the first plurality of LAAs are associated with a first namespace that is provided by the storage subsystem, and the second plurality of LAAs are associated with a second namespace that is provided by the storage subsystem and that is different than the first namespace.

17. The method of claim 14, further comprising:
receiving, by the storage controller from the host engine, a storage device mapping granularity reporting command that requests a mapping granularity associated with the first plurality of LAAs; and
identifying, by the storage controller to the host engine, the first number of LBAs that were associated with each of the first plurality of LAAs.

18. The method of claim 14, wherein the storage subsystem includes NAND flash memory devices.

19. The method of claim 14, further comprising:
associating, by the storage controller in a mapping granularity table, the first plurality of LAAs with the first number of LBAs identified in the first storage device mapping granularity configuration command; and
saving, by the storage controller, the mapping granularity table in the storage subsystem.

20. The method of claim 19, wherein the mapping granularity table is a namespace table and the first plurality of LAAs are associated with a first namespace identified in the namespace table.

* * * * *

UNITED STATES PATENT AND TRADEMARK OFFICE
CERTIFICATE OF CORRECTION

| | | |
|---|---|---|
| PATENT NO. | : 11,314,655 B2 | Page 1 of 1 |
| APPLICATION NO. | : 16/750594 | |
| DATED | : April 26, 2022 | |
| INVENTOR(S) | : Dong et al. | |

It is certified that error appears in the above-identified patent and that said Letters Patent is hereby corrected as shown below:

In the Claims

Claim 8, Column 17, Line 7, "the second physical locations" should be changed to --the second physical location, in--.

Signed and Sealed this
Twenty-sixth Day of July, 2022

Katherine Kelly Vidal
*Director of the United States Patent and Trademark Office*